(12) United States Patent
Miyazaki et al.

(10) Patent No.: US 10,736,108 B2
(45) Date of Patent: Aug. 4, 2020

(54) MANAGEMENT METHOD, MANAGEMENT APPARATUS, AND INFORMATION PROCESSING APPARATUS

(71) Applicant: YAMAHA CORPORATION, Hamamatsu-shi (JP)

(72) Inventors: Hiroshi Miyazaki, Hamamatsu (JP); Mizuyuki Shirai, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/437,030

(22) Filed: Jun. 11, 2019

(65) Prior Publication Data

US 2019/0297625 A1     Sep. 26, 2019

Related U.S. Application Data

(63) Continuation of application No. PCT/JP2017/044147, filed on Dec. 8, 2017.

(30) Foreign Application Priority Data

Dec. 20, 2016    (JP) .................................. 2016-246445

(51) Int. Cl.
*H04W 72/04*      (2009.01)
*H04B 1/16*       (2006.01)
(Continued)

(52) U.S. Cl.
CPC .......... *H04W 72/0453* (2013.01); *H04B 1/04* (2013.01); *H04B 1/16* (2013.01); *H04W 16/20* (2013.01); *H04W 72/02* (2013.01)

(58) Field of Classification Search
CPC ........................ H04W 72/0453; H04W 72/04
See application file for complete search history.

(56) References Cited

U.S. PATENT DOCUMENTS 6,987,949 B2    1/2006   Taniguchi et al.
8,571,566 B2 * 10/2013   Li .......................... H04W 28/18
                                                       455/450
(Continued)

FOREIGN PATENT DOCUMENTS

JP          H05183956 A     7/1993
JP          2003143022 A    5/2003
(Continued)

OTHER PUBLICATIONS

International Search Report issued in Intl. Appln. No. PCT/JP2017/044147 dated Feb. 27, 2018. English translation provided.
(Continued)

*Primary Examiner* — Tuan H Nguyen
(74) *Attorney, Agent, or Firm* — Rossi, Kimms & McDowell LLP

(57) ABSTRACT

A management method includes generating frequency information indicative of a frequency band of radio waves available to a first audio system from among a plurality of audio systems, by reference to radio wave information indicative of a frequency band of radio waves used by a second audio system, other than the first audio system, from among the plurality of audio systems, where each audio system includes one or more receiving devices for wireless reception of an audio signal; and transmitting the generated frequency information to the first audio system.

14 Claims, 6 Drawing Sheets

(51) Int. Cl.
*H04B 1/04* (2006.01)
*H04W 72/02* (2009.01)
*H04W 16/20* (2009.01)

(56) References Cited

U.S. PATENT DOCUMENTS

| | | |
|---|---|---|
| 8,670,380 B2 | 3/2014 | Green, III et al. |
| 2003/0157916 A1 | 8/2003 | Kamimura |
| 2011/0250916 A1 | 10/2011 | Li et al. |

FOREIGN PATENT DOCUMENTS

| | | |
|---|---|---|
| JP | 2003244008 A | 8/2003 |
| JP | 2012095285 A | 5/2012 |
| JP | 2013524696 A | 6/2013 |
| WO | 2011127445 A2 | 10/2011 |

OTHER PUBLICATIONS

Written Opinion issued in Intl. Appln. No. PCT/JP2017/044147 dated Feb. 27, 2018.

\* cited by examiner

MANAGEMENT METHOD, MANAGEMENT APPARATUS, AND INFORMATION PROCESSING APPARATUS

CROSS REFERENCE TO RELATED APPLICATIONS

This application is a Continuation Application of PCT Application No. PCT/JP2017/044147, filed Dec. 8, 2017, and is based on and claims priority from Japanese Patent Application No. 2016-246445, filed Dec. 20, 2016, the entire content of which is incorporated herein by reference.

BACKGROUND

Technical Field

The present disclosure relates to a technology for radio wave management of one or more frequency band deployed in an audio system comprising one or more receiving devices that wirelessly receive audio signals.

Background Information

In an audio system in which plural receiving devices are provided (a wireless microphone system), each of which receiving device wirelessly receives at least one audio signal from a corresponding sound receiving device, it is important to set a frequency band of radio waves for each of the receiving devices in a suitable manner. Japanese Patent Application Laid-Open Publication No. 2003-244008 (hereafter, JP 2003-244008) discloses a configuration in which a main device selected from among the receiving devices communicates with other of the receiving devices, and non-overlapping frequency bands are set for each of the respective receiving devices.

In the technology according to JP 2003-244008, radio wave interference among receiving devices constituting an audio system is suppressed. However, such interference may nonetheless occur among discrete audio systems that are located proximate to one another. For example, such interference may occur among audio systems that are sited at different levels within the same facility. Further, radio wave interference may occur where an external device is provided proximate to an audio system.

SUMMARY

It is thus an object of the present disclosure to minimize a possibility of radio waves used in an audio system interfering with radio waves of another device.

In one aspect, a management method according to the present disclosure is a computer-implemented management method, and the method generates frequency information indicative of a frequency band of radio waves available to a first audio system from among a plurality of audio systems, by reference to radio wave information indicative of a frequency band of radio waves used by a second audio system, other than the first audio system, from among the plurality of audio systems, where each audio system includes one or more receiving devices for wireless reception of an audio signal; and transmits the generated frequency information to the first audio system.

In another aspect, a management apparatus according to the present disclosure is a management apparatus communicable with a plurality of audio systems, each of which includes one or more receiving devices for wireless reception of an audio signal, and the management apparatus includes at least one processor, and a memory coupled to the at least one processor for storage of instructions executable by the processor and that upon execution cause the processor to: generate frequency information indicative of a frequency band of radio waves available to a first audio system from among the plurality of audio systems, by reference to radio wave information indicative of a frequency band of radio waves used by a second audio system, other than the first audio system, from among the plurality of audio systems; and transmit the generated frequency information to the first audio system.

In still another aspect, an information processing apparatus according to the present disclosure is an information processing apparatus used for an audio system that includes one or more receiving devices for wireless reception of an audio signal, the information processing apparatus includes at least one processor, and a memory coupled to the processor, for storage of instructions executable by the processor and that upon execution cause the processor to: set a frequency band of radio waves used by the audio system; and transmit position information indicative of a position at which the audio system is sited and radio wave information indicative of the frequency band of radio waves used by the audio system to a management apparatus communicable with a plurality of audio systems.

DESCRIPTION OF THE EMBODIMENTS

First Embodiment

Figure 1:
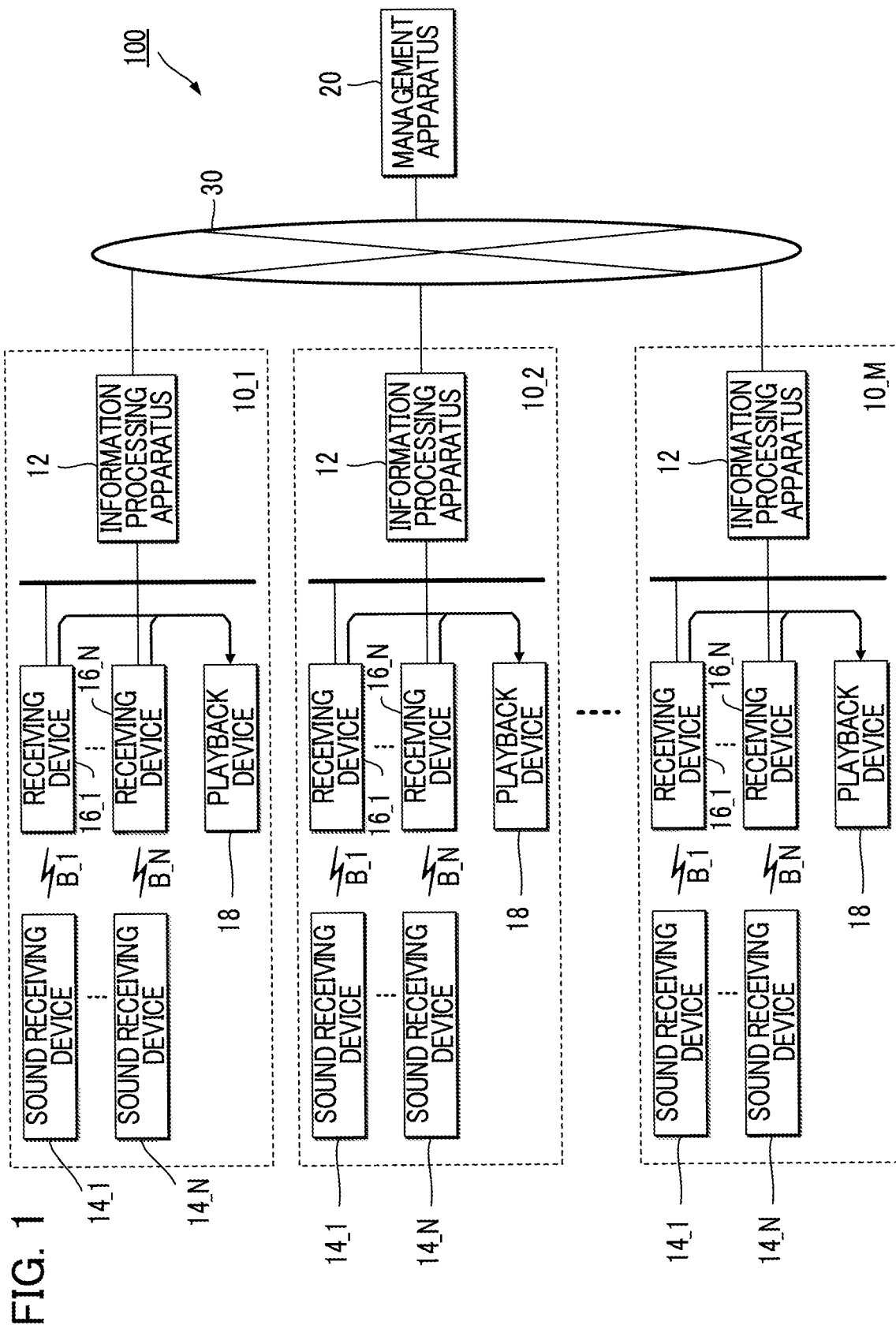
FIG. 1 is a block diagram of a communication system according to a first embodiment of the present disclosure.

FIG. 1 is a block diagram of a communication system 100 according to a first embodiment of the present disclosure. As illustrated in FIG. 1, the communication system 100 includes a plurality of (M) audio systems 10_1 to 10_M and a management apparatus 20. The management apparatus 20 is a server system (for example, a web server) communicable with each of the M audio systems 10_1 to 10_M via a communication network 30 such as the Internet, and manages an operation of each of the M audio systems 10_1 to 10_M. Each audio system 10_$m$ (m=1 to M) is sited in an event space such as a hall where a variety of events such as concerts or lectures are held, for example. The M audio systems 10_1 to 10_M are sited at different locations within the event space.

Each of the M audio systems 10_1 to 10_M is an N-channel wireless microphone system including an information processing apparatus 12, a plurality of (N) sound receiving devices 14_1 to 14_N, a plurality of (N) receiving devices 16_1 to 16_N, and a playback device 18. The N sound receiving devices 14_1 to 14_N and the N receiving devices 16_1 to 16_N correspond to each other on a one-to-one basis. It is of note that a total number N of the sound receiving devices 14_$n$ (n=1 to N) or the receiving devices 16_$n$ may differ depending on the audio system 10. In the following description for the sake of convenience, a case is assumed where the total number N is equal among the M audio systems 10_1 to 10_M.

The information processing apparatus 12 in each of the M audio systems 10_1 to 10_M can communicate with the management apparatus 20 via the communication network 30. Further, in any one audio system 10_$m$, the N receiving devices 16_1 to 16_$n$ can communicate with the information processing apparatus 12, for example, via a communication network such as a local area network (LAN). It is of note that since the M audio systems 10_1 to 10_M have the same configuration, a representative configuration of any one audio system 10_$m$ is set forth in the following description.

Figure 2:
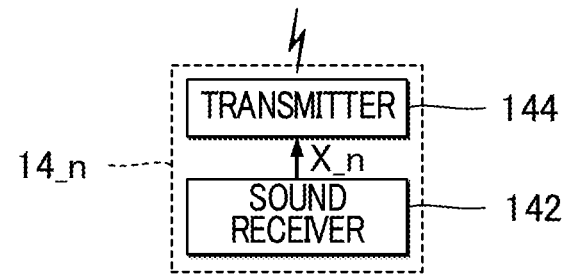
FIG. 2 is a block diagram of a sound receiving device.
Figure 3:
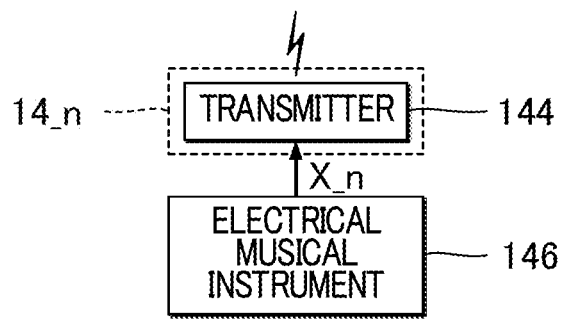
FIG. 3 is another block diagram of the sound receiving device.

Any one sound receiving device 14_$n$ of the audio system 10_$m$ is a portable wireless microphone that wirelessly transmits an audio signal X_n representative of a waveform of a variety of sounds such as those of speech or music. Specifically, as illustrated in FIG. 2, the sound receiving device 14_$n$ used includes a sound receiver 142 that generates the audio signal X_n by receiving sound, and a transmitter 144 that wirelessly transmits the audio signal X_n generated by the sound receiver 142. A specific form of the sound receiving device 14_$n$ can be freely selected. For example, the sound receiving device 14_$n$ can be of a body-pack-type in which the sound receiver 142 and the transmitter 144 comprise separate bodies and are connected to each other by wire or wirelessly; or the sound receiving device 14_$n$ can be a hand-held type in which the sound receiver 142 and the transmitter 144 are accommodated in a single-body casing. As illustrated in FIG. 3, the sound receiving device 14_$n$ can be one that includes the transmitter 144 that wirelessly transmits an audio signal X_n generated by an electric musical instrument 146 such as an electric stringed instrument. A frequency band (hereafter, a "use band") B_n of radio waves to be used for transmission of the audio signal X_n by each sound receiving device 14_$n$ is changed, for example, according to an instruction made by a user.

Figure 4:
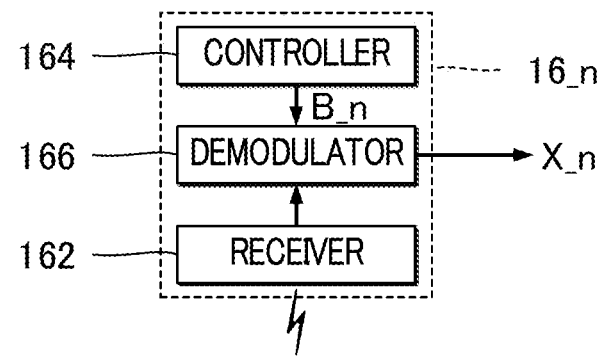
FIG. 4 is a block diagram of a receiving device.

Any one receiving device 16_$n$ of the audio system 10_$m$ may receive an audio signal X_n transmitted by the sound receiving device 14_$n$ corresponding to the receiving device 16_$n$. FIG. 4 is a block diagram of the receiving device 16_$n$. As shown in FIG. 4, the receiving device 16_$n$ includes a receiver 162, a controller 164, and a demodulator 166. The receiver 162 includes, for example, an antenna that receives radio waves from surrounding objects, and the receiver 162 generates a reception signal representative of radio field intensity. The controller 164 indicates a use band B_n to the demodulator 166. The controller 164 of the receiving device 16_$n$ indicates, to the demodulator 166, a use band B_n that is the same as the one that is used by the sound receiving device 14_$n$ corresponding to the receiving device 16_$n$. The demodulator 166 extracts and demodulates signal components in the use band B_n indicated by the controller 164 from the reception signal generated by the receiver 162, thereby to generate the audio signal X_n. The audio signal X_n generated by the demodulator 166 of each receiving device 16_$n$ is supplied to the playback device 18.

Figure 5:
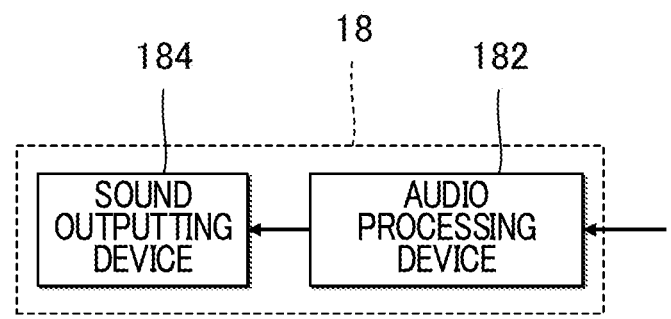
FIG. 5 is a block diagram of a playback device.

The playback device 18 plays a sound according to N-channel audio signals X_1 to X_N supplied from the different receiving devices 16_$n$. As illustrated in FIG. 5, the playback device 18 includes an audio processing device 182 and a sound outputting device 184. The audio processing device 182 is a mixer that adds the N-channel audio signals X_1 to X_N. In some embodiments, the audio processing device 182 may adjust volume or frequency characteristics of each audio signal X_n, or may apply various audio effects to each audio signal X_n. The sound outputting device 184 (for example, a speaker) outputs sound waves depending on the audio signal processed by the audio processing device 182.

The information processing apparatus 12 of the audio system 10_$m$ sets N use bands B_1 to B_N that are used in the audio system 10_$m$. Specifically, the information processing apparatus 12 sets the N use bands B_1 to B_N so that the N use bands B_1 to B_N do not overlap (more specifically, the radio waves in the respective use bands B_n do not interfere with each other).

Figure 6:
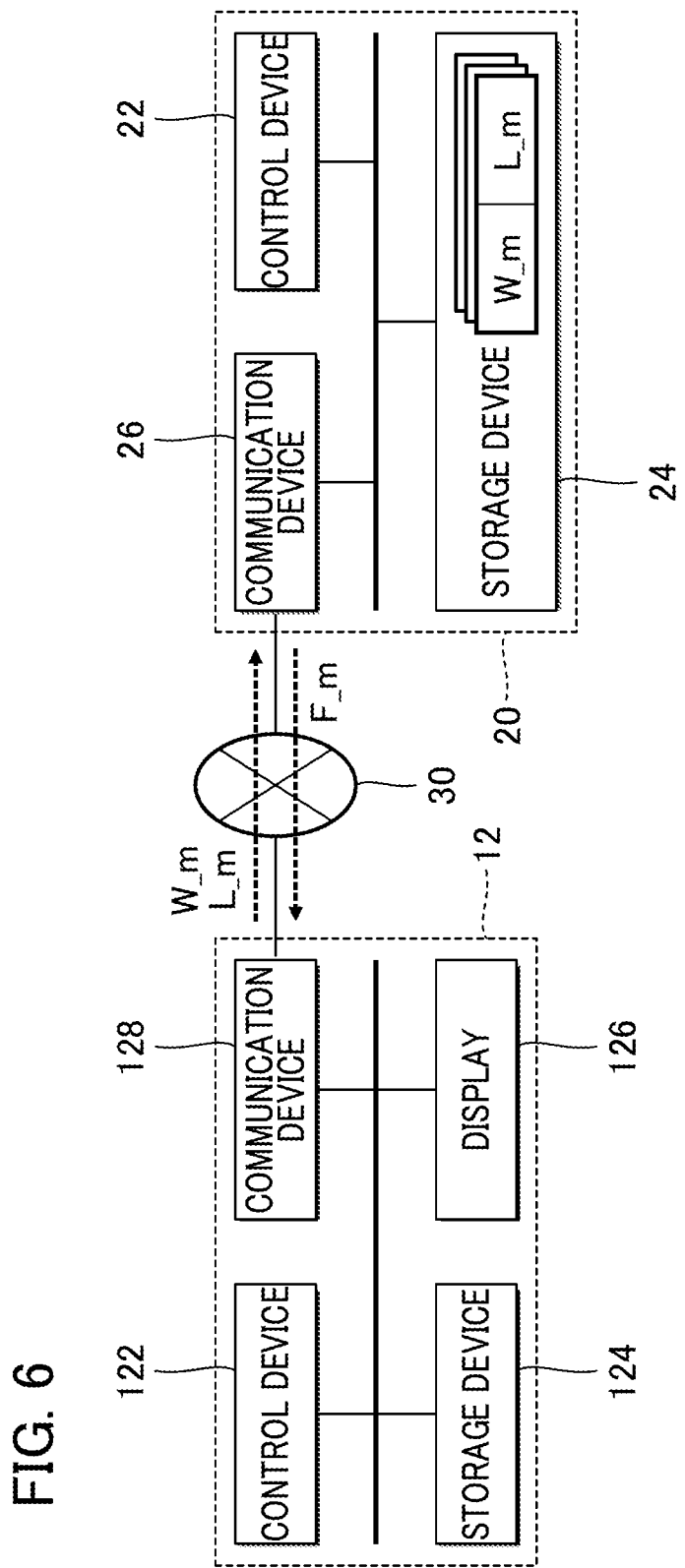
FIG. 6 is a block diagram of an information processing apparatus and a management apparatus.

FIG. 6 is a block diagram of the information processing apparatus 12 and the management apparatus 20. As shown in FIG. 6, the information processing apparatus 12 is realized by a computer system including a control device 122, a storage device 124, a display 126, and a communication device 128. For example, an information device such as a personal computer is used as the information processing apparatus 12.

The control device 122 is, for example, processing circuitry that includes a central processing unit (CPU), and integrally controls the entire information processing apparatus 12. The storage device 124 is formed of, for example, a known recording medium such as a magnetic recording medium or a semiconductor recording medium, and stores a program to be executed by the control device 122 and a variety of data for use by the control device 122. The storage device 124 may be realized by multiple recording media of the same type or of different types. The display 126 (for example, a liquid crystal display panel) displays a variety of images under control of the control device 122.

The communication device 128 communicates with the management apparatus 20 via the communication network 30. Communication between the communication device 128 and the communication network 30 may be either wired or wireless. As illustrated in FIG. 6, the communication device 128 of the audio system 10_$m$ receives frequency information F_m from the management apparatus 20. The frequency information F_m is information indicative of a frequency band available to the audio system 10_$m$. Specifically, among frequency bands (hereafter, "unit bands") obtained by dividing an entire frequency band that can be allocated to the M audio systems 10_1 to 10_M into predetermined widths, a combination of two or more (specifically, a number exceeding N) unit bands is designated by the frequency information F_m.

The management apparatus 20 is a computer system for transmitting the frequency information F_m to the audio system 10_$m$, and includes a control device 22, a storage device 24, and a communication device 26. The control device 22 is, for example, processing circuitry including a CPU, and integrally controls the entire management apparatus 20. The communication device 26 communicates with each of the M audio systems 10_1 to 10_M (specifically, each information processing apparatus 12) via the communication network 30. The storage device 24 is formed of, for example, a known recording medium such as a magnetic recording medium or a semiconductor recording medium, and stores a program to be executed by the control device 22 and a variety of data for use by the control device 22.

The storage device 24 stores radio wave information W_m and position information L_m for the audio system 10_m in which the N use bands B_1 to B_N have already been set. The radio wave information W_m is information for designating the N use bands B_1 to B_N actually set by the information processing apparatus 12 of the audio system 10_m. For example, the radio wave information W_m can be a data table in which identification information of each receiving device 16_n and the use band B_n of the receiving device 16_n are associated with each of the N receiving devices 16_1 to 16_N. The identification information of each receiving device 16_n may be omitted.

On the other hand, the position information L_m is information indicative of a position at which the audio system 10_m is sited. For example, the position information L_m can be information indicative of a position (longitude and latitude) measured using the Global Positioning System (GPS) or information such as an address or facility name input by a user to the information processing apparatus 12. For example, information indicative of a position identified from an IP address of the information processing apparatus 12 or a position identified by using short-range wireless communication such as WiFi (registered trademark) may be used as the position information L_m. As will be understood from the above description, it would suffice if the position information L_m served to identify a general range (specifically, a range within which the radio waves used by the audio system 10_m is reachable), such as a position at which the audio system 10_m is sited, and the position information L_m need not serve to identify only a single geographical point.

As will be understood from the above description, it is possible to identify the N use bands B_1 to B_N that are actually used at the place at which the audio system 10_m is sited, by referring to a correspondence between the radio wave information W_m and the position information L_m stored in the storage device 24.

Figure 7:
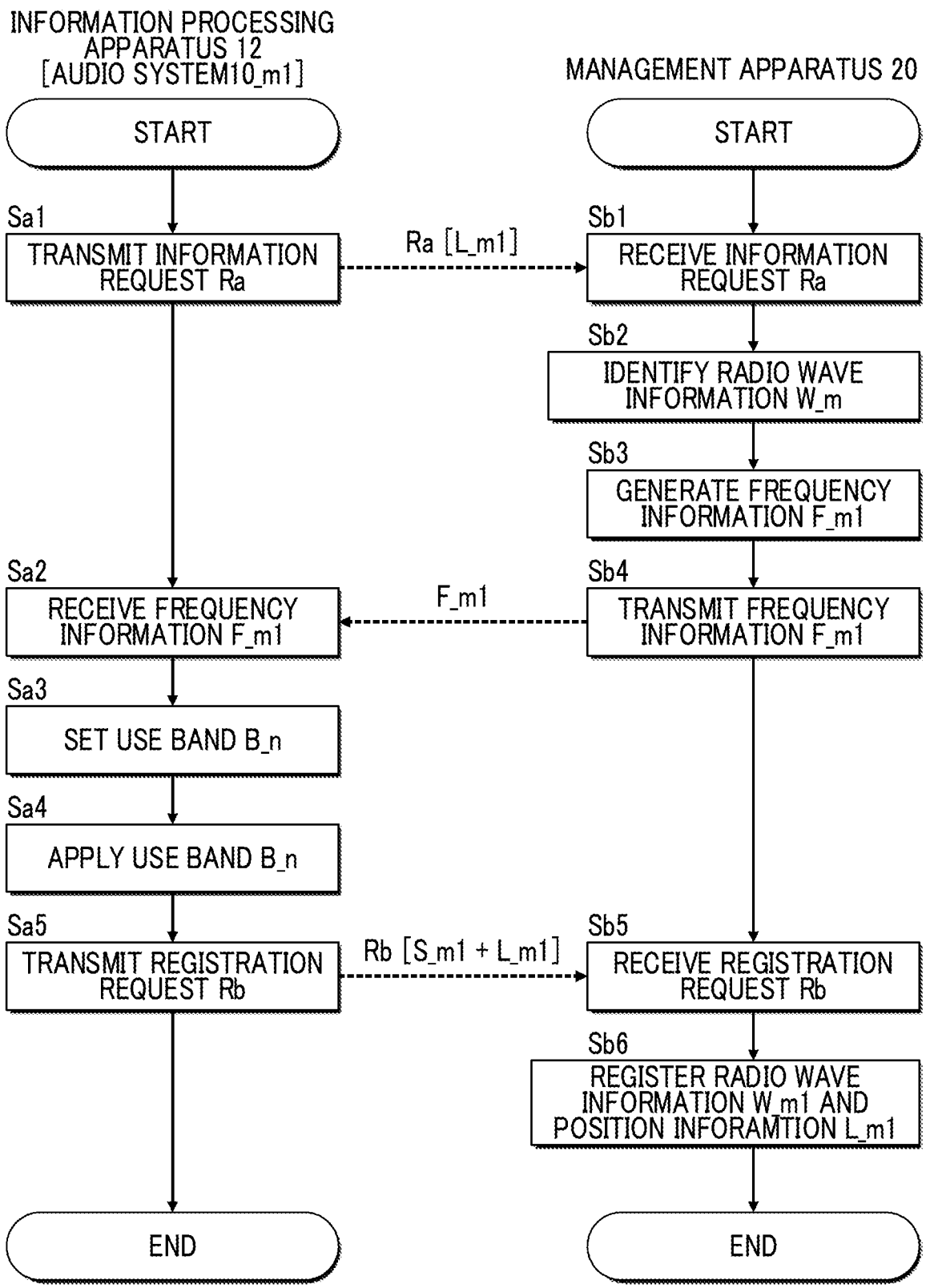
FIG. 7 is a flowchart illustrating an operation of each of the information processing apparatus and the management apparatus.

FIG. 7 is a flowchart of an operation of the communication system 100. An operation of the information processing apparatus 12 (the control device 122) in any one audio system 10_m1 (m1=1 to M) and an operation of the management apparatus 20 (the control device 22) are illustrated together in the drawing, for the sake of convenience. The control device 122 executes the program stored in the storage device 124 to execute a process illustrated at the left side of FIG. 7, and the control device 22 executes the program stored in the storage device 24 to execute a process illustrated at the right side of FIG. 7. The functions of the control device 122 and those of the control device 22 can be distributed across a plurality of devices. Alternatively, dedicated electronic circuitry may be used to realize a part of the functions of the control device 122 and the functions of the control device 22.

A process illustrated at the left side of FIG. 7 is a process that is executed immediately after commencement of use of the audio system 10_m1. This process is a process for setting N use bands B_1 to B_N for the audio system 10_m1. A case is assumed here where the N use bands B_1 to B_N have already been set for the audio system 10_m2 (m2=1 to M, m2≠m1), which is sited proximate to the audio system 10_m1. Since the audio system 10_m1 (an example of a first audio system 10) and the audio system 10_m2 (an example of a second audio system 10) are also proximate to each other, radio wave interference is likely to occur between the audio system 10_m1 and the audio system 10_m2 when overlap exists in use bands B_n between the audio system 10_m1 and the audio system 10_m2.

The control device 122 of the information processing apparatus 12 in the audio system 10_m1 transmits an information request Ra indicative of a request for frequency information F_m1. The request is transmitted from the communication device 128 to the management apparatus 20 (Sa1), and includes position information L_m1 on the audio system 10_m1. That is, the control device 122 and the communication device 128 of the information processing apparatus 12 together serve as an element that transmits the position information L_m1 of the audio system 10_m1 to the management apparatus 20.

The control device 22 of the management apparatus 20 receives the information request Ra transmitted by the information processing apparatus 12 of the audio system 10_m1, via the communication device 26 (Sb1). That is, the control device 22 and the communication device 26 of the management apparatus 20 together serve as an element (an information receiver) that receives the position information L_m1 indicative of a position of the audio system 10_m1 from the audio system 10_m1.

The control device 22 generates frequency information F_m1 indicative of a frequency band available to the audio system 10_m1 in accordance with the radio wave information W_m and the position information L_m stored in the storage device 24 for an audio system 10_m for which the use band B_n has already been set. The frequency information F_m1 is generated also in accordance with the position information L_m1 in the information request Ra received from the audio system 10_m1 (Sb2, Sb3). The control device 22 sets the frequency information F_m1 by referring to the radio wave information W_m at a position proximate to the audio system 10_m1.

Specifically, the control device 22 searches the storage device 24 for position information L_m that indicates a position proximate to the position indicated by the position information L_m1 in the information request Ra, and identifies radio wave information W_m that corresponds to the position information L_m (Sb2). That is, the radio wave information W_m is identified for an audio system 10_m that is proximate to the audio system 10_m1; namely, the audio system 10_m with respect to which radio wave interference with the audio system 10_m1 is likely to occur when the use bands B_n overlap. As described above, a case is assumed here in which the use band B_n has already been set for the audio system 10_m2 that is proximate to the audio system 10_m1. Accordingly, the control device 22 identifies radio wave information W_m2 indicative of the N use bands B_1 to B_N set for the audio system 10_m2 in step Sb2.

The control device 22 generates frequency information F_m1 that designates two or more unit bands from among unit bands that do not overlap any of the use bands B_n indicated by the radio wave information W_m identified in step Sb2 (Sb3). That is, there is generated the frequency information F_m1 indicative of two or more unit bands, exclusive of the use band B_n of the other audio system 10_m2 located proximate to the audio system 10_m1. As will be understood from the above description, by execution of the program stored in the storage device 24, the control device 22 serves as an element (an information generator) that generates the frequency information F_m1 indicative of the frequency band available to the audio system 10_m1 by referring to the radio wave information W_m2 of the other audio system 10_m2.

The control device 22 transmits the frequency information F_m1 generated in the above procedure to the audio system 10_m1, which is a request source (Sb4). That is, the control device 22 and the communication device 26 together serve as an element (an information transmitter) that transmits the frequency information F_m1 to the audio system 10_*m*1. The control device 122 of the information processing apparatus 12 in the audio system 10_*m*1 receives the frequency information F_m1 transmitted from the management apparatus 20 via the communication device 128 (Sa2).

The control device 122 sets N use bands B_1 to B_N that are used by the audio system 10_*m*1 by use of the frequency information F_m1 received from the management apparatus 20 (Sa3). Specifically, the control device 122 selects any N unit bands from among the unit bands designated by the frequency information F_m1 as the use bands B_1 to B_N. As will be understood from the above description, by execution of the program stored in the storage device 124, the control device 122 serves as an element (a frequency setter) that sets N use bands B_1 to B_N that are used in the audio system 10_*m*1. In some embodiments, the audio system 10_*m*1 may notify the management apparatus 20 of the total number N of the receiving devices 16_*n* in the audio system 10_*m*1, and the management apparatus 20 may transmit the frequency information F_m1 for designating the N unit bands as the use bands B_1 to B_N to the audio system 10_*m*1, for example. In a case where the frequency information F_m1 designates the N use bands B_1 to B_N, a process of selecting the N use bands B_1 to B_N from among the unit bands designated by the frequency information F_m1 is omitted.

The control device 122 applies each use band B_n set according to the frequency information F_m, to the audio system 10_*m*1 (Sa4). Specifically, the control device 122 indicates each use band B_n to the corresponding receiving device 16_*n*. The controller 164 of the receiving device 16_*n* indicates the use band B_n indicated by the information processing apparatus 12 to the demodulator 166. Further, the control device 122 presents to the user the N use bands B_1 to B_N by displaying the N use bands B_1 to B_N on the display 126. The user indicates instruction of each of the use bands B_n displayed on the display 126 for a corresponding sound receiving device 14_*n*. The transmitter 144 of the sound receiving device 14_*n* transmits the audio signal X_n to the receiving device 16_*n* by way of the radio waves of the use band B_n. By this process, radio waves of the N use bands B_1 to B_N that do not overlap the use band B_n of the audio system 10_*m*2 proximate to the audio system 10_*m*1 are used in the audio system 10_*m*1. As a result, possible radio wave interference between the audio system 10_*m*1 and the audio system 10_*m*2 can be minimized.

When the N use bands B_1 to B_N are applied to the audio system 10_*m*1 in the above procedure, the control device 122 transmits a registration request Rb that requests registration of the use bands B_1 to B_N in use by the audio system 10_*m*1 from the communication device 128 to the management apparatus 20 (Sa5). The registration request Rb includes the position information L_m1 indicative of the position of the audio system 10_*m*1 and radio wave information W_m1 indicative of the N use bands B_1 to B_N used by the audio system 10_*m*1. As will be understood from the above description, the control device 122 and the communication device 128 together serve as an element (an information transmitter) that transmits the position information L_m1 and the radio wave information W_m1 to the management apparatus 20.

The control device 22 of the management apparatus 20 receives the registration request Rb transmitted by the information processing apparatus 12 of the audio system 10_*m*1 by use of the communication device 26 (Sb5). The control device 22 registers the position information L_m1 and the radio wave information W_m1 included in the registration request Rb in the storage device 24 in association with each other (Sb6). That is, the position information L_m and the radio wave information W_m are registered in the storage device 24 for the audio system 10_*m* in which the N use bands B_1 to B_N have been set. Once the position information L_m1 and the radio wave information W_m1 are registered, N use bands B_1 to B_N that do not overlap any of the use bands B_n of the audio system 10_*m*1 are set for other audio systems 10_*m*, usage of which commences proximate to the audio system 10_*m*1 at a subsequent timing.

As described above, in the first embodiment, the frequency information F_m1 indicative of the frequency band available to the audio system 10_*m*1 is generated by referring to the radio wave information W_m2 indicative of the frequency bands used by another audio system 10_*m*2 and transmitted to the audio system 10_*m*1. Specifically, the frequency information F_m1 indicative of frequency bands that do not overlap the frequency bands indicated by the radio wave information W_m2 of the audio system 10_*m*2 is generated for the audio system 10_*m*1. Accordingly, it is possible to reduce a likelihood of the radio waves used in the audio system 10_*m*1 interfering with the radio waves of the audio system 10_*m*2. In the first embodiment, in particular, referring to the radio wave information W_m2 of the audio system 10_*m*2 proximate to the audio system 10_*m*1 for generation of the frequency information F_m1 of the audio system 10_*m*1 has an advantage in that radio wave interference can be mitigated relative to the audio system 10_*m*2, in which radio wave interference with the audio system 10_*m*1 is especially likely to occur.

In the first embodiment, the position information L_m indicative of a position at which the audio system 10_*m* is sited and the radio wave information W_m indicative of frequency bands used by the audio system 10_*m* are transmitted to the management apparatus 20. With this configuration, the setting of the N use bands B_1 to B_N depending on the position of the audio system 10_*m* can be integrally managed by the management apparatus 20.

Second Embodiment

A second embodiment of the present disclosure will now be described. In each configuration illustrated below, respective components having the same actions and functions as those in the first embodiment are denoted by the same reference signs used in the description of the first embodiment, and detailed description thereof will be omitted as appropriate.

Figure 8:
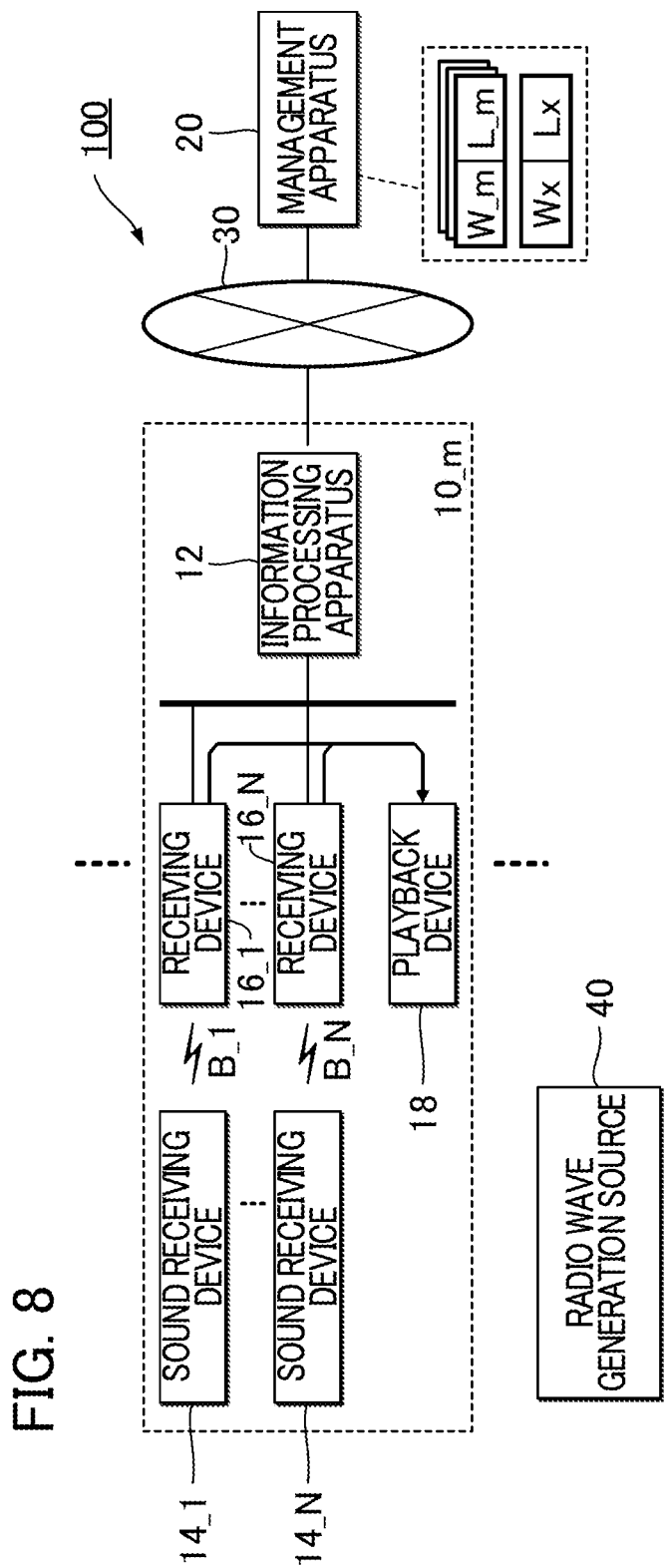
FIG. 8 is a block diagram of a communication system in a second embodiment.

FIG. 8 is a block diagram of a communication system 100 in the second embodiment. As shown in FIG. 8, an external device (hereafter, a "radio wave generation source") 40 such as an electronic device that outputs radio waves is likely to be sited proximate to any one audio system 10_*m*. When a frequency band of the radio waves radiated by the radio wave generation source 40 and a frequency band of the radio waves used by the audio system 10_*m* overlap, radio wave interference therebetween may occur. In consideration of the above circumstances, in the second embodiment, the use band B_n of the audio system 10_*m* is set such that the use band B_n does not overlap a frequency band used by the radio wave generation source 40 sited proximate to the audio system 10_*m*.

In the first embodiment, in the storage device 24 of the management apparatus 20, the radio wave information W_m and the position information L_m are registered for the audio system 10_*m* in which the use band B_n has been set. In the second embodiment, as shown in FIG. 8, radio wave information Wx indicative of a frequency band of radio waves that are used by a radio wave generation source 40 other than M audio systems 10_1 to 10_M is stored in the storage device 24 together with position information Lx indicative of a position of the radio wave generation source 40, in addition to the radio wave information W_m and the position information L_m of each audio system 10_*m*. That is, multiple pieces of radio wave information W (Wx, W_m) including radio wave information W_m indicative of a frequency band (use band B_n) of radio waves that is used by any one audio system 10_*m*, and the radio wave information Wx indicative of the frequency band of the radio waves that is used by the radio wave generation source 40 are stored in the storage device 24 of the second embodiment.

Among the M audio systems 10_1 to 10_M, an audio system 10_*m* that is proximate enough to the radio wave generation source 40 to the extent that the radio waves from the radio wave generation source 40 can be received with significant intensity generates radio wave information Wx of the radio wave generation source 40 and transmits the radio wave information Wx to the management apparatus 20. Specifically, any one of the N receiving devices 16_1 to 16_N of the audio system 10_*m* receives external radio waves including radio waves from the radio wave generation source 40, via the receiver 162. The reception of the external radio waves is performed when the N sound receiving devices 14_1 to 14_N are not transmitting radio waves. The controller 164 of the receiving device 16 executes frequency analysis such as fast Fourier transform on a reception signal received via the receiver 162 to identify frequency characteristics of the radio waves radiated from the radio wave generation source 40. The information processing apparatus 12 of the audio system 10_*m* generates a registration request Rb including radio wave information Wx indicative of a frequency band of the radio waves radiated from the radio wave generation source 40 and the position information Lx indicative of the position of the radio wave generation source 40, and transmits the registration request Rb from the communication device 128 to the management apparatus 20. It should be noted that the position of the audio system 10_*m* may be used as an approximate position of the radio wave generation source 40. The control device 22 of the management apparatus 20 registers, in the storage device 24, the radio wave information Wx and the position information Lx contained in the registration request Rb received from the audio system 10_*m* by the communication device 26.

When the information request Ra is received from any one audio system 10_*m*1 (Sb1), the control device 22 of the management apparatus 20 identifies radio wave information W corresponding to the position information L of a position proximate to the audio system 10_*m*1 (the position information L_m of the audio system 10_*m* or position information Lx of the radio wave generation source 40) (Sb2). Further, as in the first embodiment, in step Sb3, the control device 22 generates frequency information F_m indicative of a frequency band that does not overlap the frequency band indicated by the radio wave information W identified in step Sb2, and transmits the generated frequency information F in step Sb4.

When the audio system 10_*m*1, which has transmitted the information request Ra, is located proximate to the radio wave generation source 40, the radio wave information Wx of the radio wave generation source 40 is identified in step Sb2. Therefore, in step Sb3, the control device 22 generates frequency information F_m1 indicative of two or more unit bands, exclusive of a frequency band of the radio wave radiated by the radio wave generation source 40.

In the second embodiment, the same effects as those of the first embodiment are attained. In the second embodiment, radio wave information Wx indicative of the frequency band of radio waves radiated by the radio wave generation source 40 is registered in the management apparatus 20, and referred to for generation of frequency information F_m1 indicative of a frequency band available to the audio system 10_*m*1. Therefore, possibility can be reduced of the radio waves from the radio wave generation source 40 interfering with the radio waves of the audio system 10_*m*1. In the foregoing, an example is given of a configuration in which both the radio wave information W_m of each audio system 10_*m* and the radio wave information Wx of the radio wave generation source 40 other than the audio system 10_*m* are registered in the management apparatus 20. Alternatively, only the radio wave information Wx of the radio wave generation source 40 may be registered in the management apparatus 20. That is, the registration of the radio wave information W_m of the audio system 10_*m* may be omitted.

Third Embodiment

For example, a radio wave generation source 40 such as that in a vehicle is likely to move. As illustrated in the second embodiment, each of the M audio systems 10_1 to 10_M notifies the management apparatus 20 of the radio wave information Wx and the position information Lx of a radio wave generation source 40 that exists proximate to the audio system in the form of the registration request Rb. In the above configuration, for example, when the radio wave generation source 40 moves with time within a range in which the M audio systems 10_1 to 10_M are distributed, each audio system 10_*m* notifies, at each of multiple points in time during movement of the radio wave generation source 40, the management apparatus 20 of position information Lx indicative of the position of the radio wave generation source 40 and radio wave information Wx indicative of a radio wave state at the point in time. That is, the management apparatus 20 can acquire a series of multiple pieces of position information Lx corresponding to the movement of the radio wave generation source 40. Therefore, the control device 22 of the management apparatus 20 according to the third embodiment identifies a route (hereafter, a "movement route") along which the radio wave generation source 40 has moved, by referring to the series of the multiple pieces of position information Lx.

Figure 9:
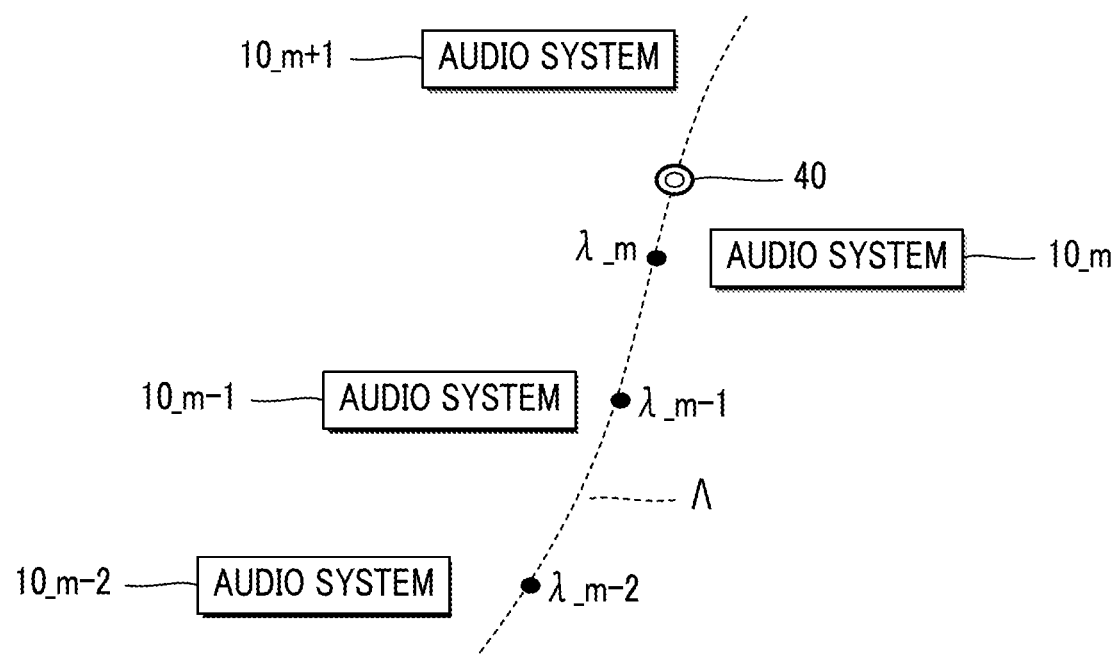
FIG. 9 is an illustrative diagram of an operation of the management apparatus in a third embodiment.

FIG. 9 illustrates a series of pieces of position information Lx transmitted from respective audio systems 10_*m* to the management apparatus 20 in conjunction with the movement of the radio wave generation source 40. A position $\lambda\_\_m-2$ in FIG. 9 is a position indicated by position information Lx transmitted from the audio system 10_*m*−2 to the management apparatus 20 where the radio wave generation source 40 is proximate to the audio system 10_*m*−2. Similarly, a position $\lambda\_\_m-1$ is a position indicated by position information Lx transmitted from the audio system 10_*m*−1 where the radio wave generation source 40 is proximate to the audio system 10_*m*−1. A position $\lambda\_\_m$ is a position indicated by position information Lx transmitted from the audio system 10_*m* where the radio wave generation source 40 is located proximate to the audio system 10_*m*. The control device 22 of the management apparatus 20 identifies a route of movement Λ of the radio wave generation source 40 from prior-position transitions of the radio wave generation source 40 (λ_m-2→λ_m-1→λ_m).

As will be understood from FIG. 9, when the radio wave generation source 40 continues to move along the movement route Λ, it can be predicted that the radio wave generation source 40 will approach and pass close by an audio system 10_m+1. The control device 22 of the management apparatus 20 identifies the audio system 10_m+1 that the radio wave generation source 40 is likely to approach, from the movement route Λ, and generates, for the audio system 10_m+1, frequency information F_m+1 indicative of two or more unit bands, exclusive of the frequency band indicated by the radio wave information Wx of the radio wave generation source 40 (Sb3). That is, a frequency band of radio waves radiated by the radio wave generation source 40 is excluded from candidates for N use bands B_1 to B_N for the audio system 10_m+1.

In the third embodiment, the same effects as those of the first and second embodiments can be attained. Further, in the third embodiment, an advantage exists in that it is possible to reduce a possibility of the radio waves used by each audio system 10_m from interfering with the radio waves of the radio wave generation source 40, even when the radio wave generation source 40 radiates radio waves during movement.

Modifications

Each mode illustrated above is variously modified. Specific modifications are illustrated below. Two or more modes freely selected from the following may be combined as appropriate in so far as such combination does not result in any contradiction there between.

(1) Each of the above-described embodiments illustrates a configuration in which the information processing apparatus 12 indicates instruction of the use band B_n for each receiving device 16_n. However, a user upon viewing the use band B_n on the display 126 may manually indicate instruction of the use band B_n for the receiving device 16_n. Further, each of the above-described embodiments illustrates a configuration in which the user manually sets the use band B_n of the sound receiving device 14_n. However, the information processing apparatus 12 may indicate instruction of the use band B_n for the sound receiving device 14_n. For example, an instructed indication of the use band B_n can be wirelessly transmitted from the information processing apparatus 12 to the sound receiving device 14_n via the receiving device 16_n.

(2) Each of the above-described embodiments illustrates a configuration in which the information processing apparatus 12 is in a separate body from the receiving device 16_n. However, the functions of the information processing apparatus 12 may be mounted at one receiving device 16_n. That is, in the present disclosure the information processing apparatus 12 can be provided as a discrete single-body device or as a device that is integral with the receiving device 16_n.

(3) In each of the above embodiments, the registration request Rb including the position information L_m and the radio wave information W_m is transmitted from the information processing apparatus 12 to the management apparatus 20 (Sa5), but the content of the registration request Rb is not limited to the above illustration. For example, time information T_m indicative of a time when the audio system 10_m is used may be included in the registration request Rb together with position information L_m and radio wave information W_m. The time information T_m is, for example, information indicative of a period in which the audio system 10_m is scheduled to be used (hereafter, a "use period"). The time information T_m is generated, for example, in accordance with an instruction made by the user for transmission to the information processing apparatus 12 (specifically, designation of the use period). The control device 22 of the management apparatus 20 associatively registers (Sb6) in the storage device 24 the position information L_m, the radio wave information W_m, and the time information T_m received as the registration request Rb from the audio system 10_m. When the use period indicated by the time information T_m expires, the control device 22 deletes from the storage device 24 the position information L_m, the radio wave information W_m, and the time information T_m of the audio system 10_m. Accordingly, the N use bands B_1 to B_N that the audio system 10_m have thus far used, can be used at a position proximate to the audio system 10_m.

(4) As illustrated in each of the above-described embodiments, the management apparatus 20 is realized by the control device 22 and the program working in coordination with each other. A program according to a first aspect of the present disclosure causes a computer communicable with a plurality of audio systems, each including one or more receiving devices for wireless reception of an audio signal, to execute an information generation process (for example, step Sb3) of generating frequency information indicative of a frequency band of radio waves available to a first audio system from among the audio systems, by reference to radio wave information indicative of a frequency band of radio waves used by a second audio system, other than the first audio system, from among the audio systems, and an information transmission process (for example, step Sb4) of transmitting the frequency information generated in the information generation process to the first audio system.

Similarly, the information processing apparatus 12 illustrated in each of the above-described embodiments is realized by the control device 122 and a program working in coordination with each other. A program according to a second aspect of the present disclosure causes a computer that is used in an audio system that includes one or more receiving devices for wireless reception of an audio signal, to execute a frequency setting process (for example, step Sa3) of setting a frequency band of radio waves used by the audio system, and an information transmission process (for example, step Sa5) of transmitting, to a management apparatus communicable with the plurality of audio systems, position information that indicates a position at which the audio system is sited and radio wave information indicative of the frequency band of radio waves used by the audio system.

The program of each aspect illustrated above is a program able to be stored in a computer-readable recording medium in the computer. The recording medium is, for example, a non-transitory recording medium, and is preferably an optical recording medium (optical disc) such as a CD-ROM. However, the recording medium may be provided in any known media such as a semiconductor recording medium or a magnetic recording medium. It is of note that the non-transitory recording medium includes a freely-selected recording medium other than a transitory propagation signal, and a volatile recording medium may also be used. Further, the program may be distributed to the computer by way of any known network form.

(5) The following aspects are derivable from above embodiments and modifications, for example.

A management apparatus according to an aspect (aspect 1) of the present disclosure is a management apparatus communicable with a plurality of audio systems, each of which includes one or more receiving devices for wireless reception of an audio signal. The management apparatus includes an information generator that generates frequency information indicative of a frequency band of radio waves available to a first audio system from among the plurality of audio systems, by reference to radio wave information indicative of a frequency band of radio waves used by a second audio system, other than the first audio system, from among the plurality of audio systems, and an information transmitter that transmits the frequency information generated by the information generator to the first audio system. In this aspect, the frequency information indicative of the frequency band of the radio wave available to the first audio system is generated depending on the radio wave information of the second audio system other than the first audio system and is transmitted to the first audio system. Therefore, it is possible to reduce a possibility of the radio waves used in the first audio system interfering with the radio waves of the second audio system.

In an example (aspect 2) of aspect 1, the information generator generates, for the first audio system, frequency information indicative of a frequency band that does not overlap a frequency band indicated by the radio wave information of the second audio system. In the above aspect, frequency information indicative of the frequency band for the first audio system is generated such that overlap does not occur with the frequency band information indicated by radio wave information of the second audio system, thereby substantially obviating any possibility of interference by the radio waves used in the first audio system with the radio waves of the second audio system.

A management apparatus according to an example (aspect 3) of aspect 1 or aspect 2 includes an information receiver that receives, from the first audio system, position information indicative of a position at which the first audio system is sited, and the information generator generates the frequency information of the first audio system, by reference to a piece of radio wave information of the second audio system that is proximate to the position indicated by the position information received by the information receiver, from among a plurality of pieces of radio wave information, each indicative of a frequency band of radio waves used at each of a corresponding different position. In the above aspect, the position information is received from the first audio system, and the frequency information of the first audio system is generated with reference to the radio wave information of the second audio system that is proximate to the position indicated by the position information. Accordingly, an advantage is obtained in that it is possible to substantially suppress a possible radio wave interference that may otherwise occur between the first audio system and the second audio system where the systems have a locational relation in which such interference is likely to be particular problematic.

In an example (aspect 4) of the aspect 3, the plurality of pieces of radio wave information includes radio wave information indicative of a frequency band of radio waves used by any one of the plurality of audio systems, and radio wave information indicative of a frequency band of radio waves used by a radio wave generation source other than the plurality of audio systems. In the above aspect, the radio wave information indicative of the frequency band of radio waves generated by the radio wave generation source other than the audio systems is used for generation of the frequency information of the first audio system. In this way, a possibility is minimized of radio waves generated by the radio wave generation source other than the audio systems from interfering with radio waves of the first audio system.

An information processing apparatus according to an aspect (aspect 5) of the present disclosure is an information processing apparatus used for an audio system that includes one or more receiving devices for wireless reception of an audio signal, and the information processing apparatus includes a frequency setter that sets a frequency band of radio waves used by the audio system, and an information transmitter that transmits position information indicative of a position at which the audio system is sited and radio wave information indicative of the frequency band of radio waves used by the audio system to a management apparatus communicable with a plurality of audio systems. In the above aspect, the position information indicative of the position at which the audio system is sited and the radio wave information indicative of the frequency band of the radio waves used by the audio system are transmitted to the management device. As a result, an advantage is obtained in that setting a frequency band in accordance with a position of the audio system can be integrally managed by the management apparatus.

A communication system according to an aspect (aspect 6) of the present disclosure includes a plurality of audio systems, each including one or more receiving devices for wireless reception of an audio signal, and a management apparatus communicable with the audio systems. The management apparatus includes an information generator that generates frequency information indicative of a frequency band of radio waves available to a first audio system from among the plurality of audio systems, by reference to radio wave information indicative of a frequency band of radio waves used by a second audio system, other than the first audio system, from among the plurality of audio systems and an information transmitter that transmits the frequency information generated by the information generator to the first audio system.

DESCRIPTION OF REFERENCE SIGNS

100 Communication system
10_m (10_1 to 10_M) Audio system
12 Information processing apparatus
14_n (14_1 to 14_N) Sound receiving device
16_n (16_1 to 16_N) Receiving device
18 Playback device
182 Audio processing device
184 Sound outputting device
122 Control device
124 Storage device
126 Display
128 Communication device
20 Management apparatus
22 Control device
24 Storage device
26 Communication device
30 Communication network
40 Radio wave generation source

What is claimed is:
1. A computer-implemented management method comprising:
    receiving, from a first audio system including a plurality of receiving devices, among at least three audio systems including a second audio system that is proximate to the first audio system and a third audio system that is not proximate to the first audio system, position information indicative of a position at which the first audio system is sited;

identifying radio wave information associated with position information of the second audio system that is potentially radio interfering with the first audio system due to the second audio system being positioned proximate to the first audio system, wherein the radio wave information of the second audio system indicates a frequency band of radio waves set for use by the second audio system;

generating frequency information indicative of at least two frequency bands of radio waves available to the first audio system that do not overlap the frequency band of radio waves indicated by the identified radio wave information; and transmitting the generated frequency information to the first audio system.

2. The management method according to claim 1, wherein:

each of the at least three audio systems includes:
  a plurality of sound receivers;
  a corresponding plurality of receiving devices each configured to wirelessly receive an audio signal from corresponding one of the plurality of sound receivers; and
  an information processing apparatus,
the method further comprises:
  receiving, from each of the at least three audio systems, the radio wave information indicating the frequency band of radio waves set for use by the respective audio system, together with the position information of the respective audio system; and
  storing the received radio wave information and the position information for each audio system in an information storage device,
the identifying of the radio wave information includes identifying the radio wave information from among the radio wave information stored in the information storage device, and
the transmitting of the generated frequency information includes transmitting the generated frequency information to an information processing apparatus of the first audio system.

3. The management method according to claim 2, wherein the radio wave information of each audio system in the information storage device includes information on frequency bands corresponding to the number of the plurality of receiving devices.

4. The management method according to claim 1, wherein the frequency information indicates a set of frequency bands exceeding the number of the plurality of receiving devices.

5. A management apparatus communicable with at least three audio systems, the management apparatus comprising:

a memory storing instructions; and
at least one processor that implements the instructions to:
  receive, from a first audio system including a plurality of receiving devices, among the at least three audio systems including a second audio system that is proximate to the first audio system and a third audio system that is not proximate to the first audio system, position information indicative of a position at which the first audio system is sited;
  identifies radio wave information associated with position information of the second audio system that is potentially radio interfering with the first audio system due to the second audio system being positioned proximate to the first audio system, wherein the radio wave information of the second audio system indicates a frequency band of radio waves set for use by the second audio system;
  generate frequency information indicative of at least two frequency bands of radio waves available to the first audio system that do not overlap the frequency band of radio waves indicated by the identified radio wave information; and
  transmit the generated frequency information to the first audio system.

6. The management apparatus according to claim 5, wherein the identified radio wave information includes a plurality of pieces of radio wave information indicating frequency bands of radio waves used by any one of the at least three audio systems, and a radio wave generation source other than the at least three audio systems.

7. The management apparatus according to claim 5, wherein:

each of the at least three audio systems includes:
  a plurality of sound receivers;
  a corresponding plurality of receiving devices each configured to wirelessly receive an audio signal from corresponding one of the plurality of sound receivers; and
  an information processing apparatus, the at least one processor implements the instructions to:
    receive, from each of the at least three audio systems, the radio wave information indicating the frequency band of radio waves set for use by the respective audio system, together with the position information of the respective audio system; and
    store the received radio wave information and position information for each audio system in an information storage device,
the at least one processor, in identifying the radio wave information, identifies the radio wave information from among the radio wave information stored in the information storage device, and
the at least one processor, in transmitting the generated frequency information, transmits the generated frequency information to an information processing apparatus of the first audio system.

8. The management apparatus according to claim 7, wherein:

each of the plurality of sound receivers in each audio system includes at least one of a microphone or a musical instrument, and
each audio system further includes:
  an audio processor configured to adjust sound characteristics of the audio signals received by the receiving devices; and
  a plurality of speakers for outputting sound waves in accordance with the audio signals output by the audio processor.

9. The management apparatus according to claim 7, wherein the radio wave information stored for each audio system in the information storage device includes information on frequency bands corresponding to the number of the plurality of receiving devices.

10. The management apparatus according to claim 5, wherein the frequency information indicates a set of frequency bands exceeding the number of the plurality of receiving devices.

11. A communication system comprising:
a plurality of audio systems each including:
  a plurality of sound receivers;

a corresponding plurality of receiving devices each configured to wirelessly receive an audio signal from corresponding one of the plurality of sound receivers; and an information processing apparatus; and a management apparatus communicable with each of the plurality of audio systems using the respective information processing apparatus thereof, and including:
  a first memory storing first instructions; and
  at least one first processor that implements the first instructions to:
    receive, from an information processing apparatus of each of at least two audio systems, among the plurality of audio systems, radio wave information indicating a frequency band of radio waves set for use by the respective audio system, together with position information of the respective audio system;
    store, in an information storage device for each of the at least two audio systems, the radio wave information indicating the frequency band of radio waves set for use by the respective audio system in association with the position information of the respective audio system;
    receive, from the information processing apparatus of a first audio system other than the at least two audio systems, among the plurality of audio systems, position information indicating a position at which the first audio system is sited, the at least two audio systems including a second audio system that is proximate to the first audio system and a third audio system that is not proximate to the first audio system;
    identify, from among the radio wave information stored in the information storage device, the radio wave information associated with the position information of the second audio system that is potentially radio interfering with the first audio system due the second audio system being positioned proximate to the first audio system;
    generate frequency information indicating at least two frequency bands of radio waves available to the first audio system that do not overlap the frequency band of radio waves indicated by the identified radio wave information; and
    transmit the generated frequency information to the information processing apparatus of the first audio system,
  wherein the information processing apparatus of the first audio system includes:
    a second memory storing second instructions;
    at least one second processor that implements the second instructions to:
      transmit the position information of the first audio system to the management apparatus;
      receive the frequency information from the management apparatus; and
      set, based on the received frequency information, frequency bands of radio waves for use by the respective receiving devices in wirelessly receiving the audio signals from corresponding ones of the plurality of sound receivers in the first audio system.

12. The communication system according to claim 11, wherein the at least one second processor implements the second instructions to control displaying of the frequency bands of radio waves that have been set for use by the receiving devices of the first audio system on a display, for prompting a user of the first audio system to indicate one of the frequency bands to be used by each of the plurality of receiving devices thereof.

13. The communication system according to claim 11, wherein the at least one second processor implements the second instructions to further transmits the position information indicating the position at which the first audio system is sited and the radio wave information indicating the frequency bands of radio waves set for use by the first audio system, after setting the frequency bands.

14. A computer-implemented method for a communication system including:
  a plurality of audio systems each including:
    a plurality of sound receivers;
    a corresponding plurality of receiving devices each configured to wirelessly receive an audio signal from corresponding one of the plurality of sound receivers; and
    an information processing apparatus; and
  a management apparatus communicable with each of the plurality of audio systems using the respective information processing apparatus thereof,
  wherein the method comprises the management apparatus:
    receiving, from an information processing apparatus of each of at least two audio systems, among the plurality of audio systems, radio wave information indicating a frequency band of radio waves set for use by the respective audio system, together with position information of the respective audio system;
    storing, in an information storage device for each of the at least two audio systems, the radio wave information indicating the frequency band of radio waves set for use by the respective audio system in association with the position information of the respective audio system;
    receiving, from the information processing apparatus of a first audio system other than the at least two audio systems, among the plurality of audio systems, position information indicating a position at which the first audio system is sited, the at least two audio systems including a second audio system that is proximate to the first audio system and a third audio system that is not proximate to the first audio system;
    identifying, from among the radio wave information stored in the information storage device, the radio wave information associated with the position information of the second audio system that is potentially radio interfering with the first audio system due to the second audio system being positioned proximate to the first audio system;
    generating frequency information indicative of at least two frequency bands of radio waves available to the first audio system that do not overlap the frequency band of radio waves indicated by the identified radio wave information; and
    transmitting the generated frequency information to the information processing apparatus of the first audio system,
  wherein the method further comprises the information processing apparatus of the first audio system:
    transmitting the position information of the first audio system to the management apparatus;
    receiving the frequency information from the management apparatus; and setting, based on the received frequency information, frequency bands of radio waves for use by the respective receiving devices in wirelessly receiving the audio signals from corresponding ones of the plurality of sound receivers in the first audio system.

* * * * *